(12) United States Patent
Uemura

(10) Patent No.: US 10,178,342 B2
(45) Date of Patent: Jan. 8, 2019

(54) IMAGING SYSTEM, IMAGING APPARATUS, AND CONTROL METHOD FOR CONTROLLING THE SAME

(71) Applicant: CANON KABUSHIKI KAISHA, Tokyo (JP)

(72) Inventor: Hidetaka Uemura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/453,385

(22) Filed: Mar. 8, 2017

(65) Prior Publication Data

US 2017/0264855 A1   Sep. 14, 2017

(30) Foreign Application Priority Data

Mar. 9, 2016  (JP) .................................. 2016-045144

(51) Int. Cl.
*H04N 5/77*  (2006.01)
*G11B 31/00*  (2006.01)
*H04N 5/217*  (2011.01)

(52) U.S. Cl.
CPC ............ *H04N 5/77* (2013.01); *G11B 31/006* (2013.01); *H04N 5/217* (2013.01)

(58) Field of Classification Search
CPC ......... G11B 31/006; H04N 5/217; H04N 5/77
See application file for complete search history.

(56) References Cited

U.S. PATENT DOCUMENTS

| | | | | |
|---|---|---|---|---|
| 2003/0177503 A1* | 9/2003 | Sull | .................... | G06F 17/30796 725/112 |
| 2006/0268357 A1* | 11/2006 | Vook | .................. | H04N 1/00244 358/448 |
| 2008/0225177 A1* | 9/2008 | Horii | .................. | H04N 5/37213 348/576 |
| 2008/0284889 A1* | 11/2008 | Kinoshita | .............. | H04N 5/361 348/308 |
| 2010/0045802 A1* | 2/2010 | Oda | ........ | H04N 5/217 348/207.2 |
| 2010/0073492 A1* | 3/2010 | Kudo | .................... | H04N 5/2171 348/208.1 |
| 2010/0111489 A1* | 5/2010 | Presler | ................... | H04N 5/225 386/278 |
| 2011/0123972 A1* | 5/2011 | Friedman | ................. | G09B 5/06 434/308 |
| 2013/0342723 A1* | 12/2013 | Ishii | ....................... | H04N 5/232 348/222.1 |
| 2015/0222792 A1* | 8/2015 | Ogikubo | ................ | H04N 5/243 348/242 |

FOREIGN PATENT DOCUMENTS

JP   2007-166551 A   6/2007
JP   2010-016648 A   1/2010

* cited by examiner

*Primary Examiner* — Hung Q Dang
*Assistant Examiner* — Sunghyoun Park
(74) *Attorney, Agent, or Firm* — Canon U.S.A., Inc. IP Division

(57) ABSTRACT

An imaging apparatus causes an external output I/F to output raw image data to an external recording device and output image correction data to the external recording device every plurality of frames. The external recording device records the image data from the imaging apparatus in a moving image file in a recording medium and records the image correction data in a correction data file in the recording medium.

13 Claims, 7 Drawing Sheets

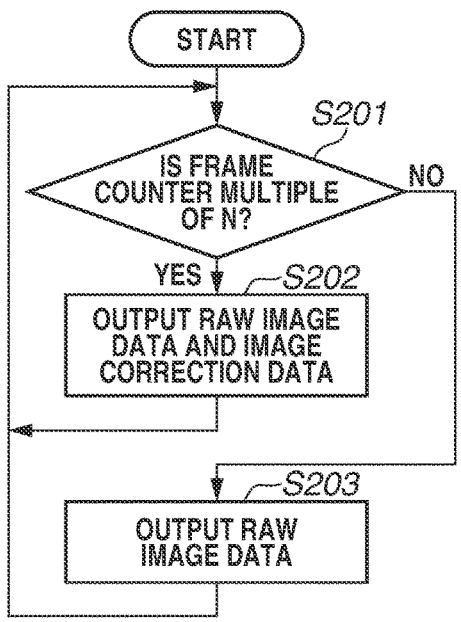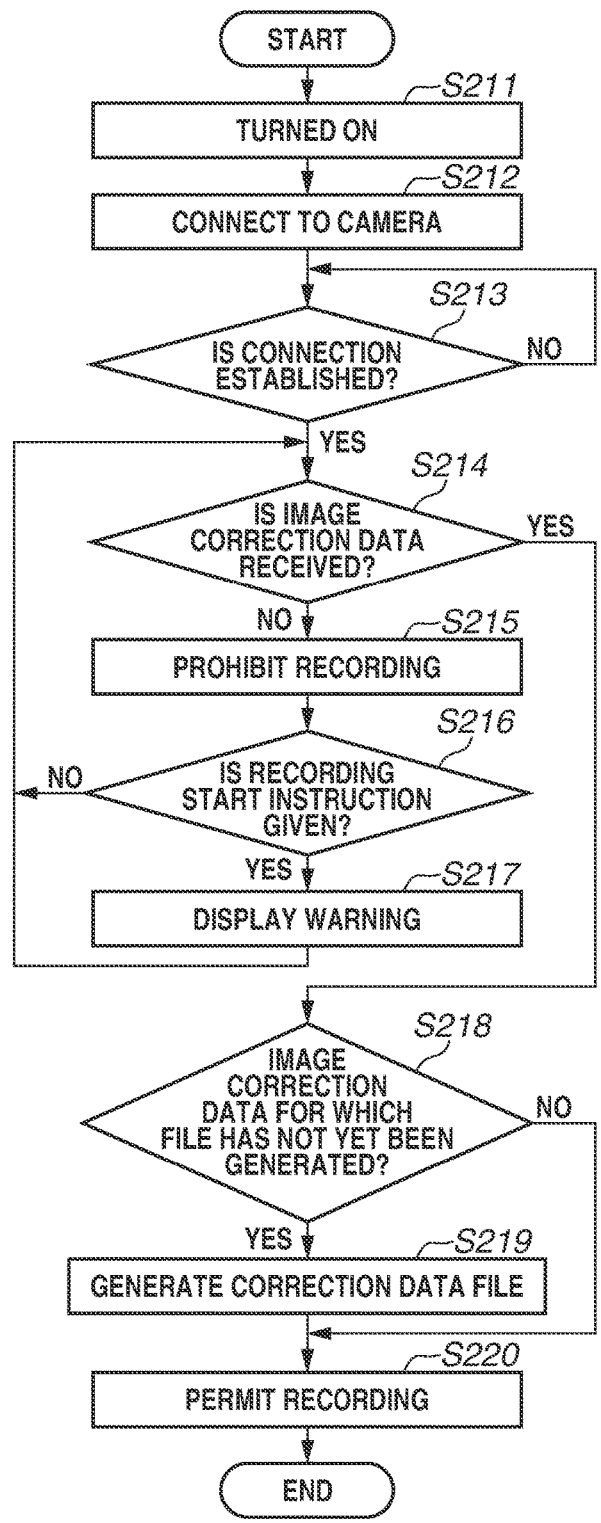

IMAGING SYSTEM, IMAGING APPARATUS, AND CONTROL METHOD FOR CONTROLLING THE SAME

BACKGROUND

Field of the Disclosure

The present disclosure relates to an imaging system, an imaging apparatus, and a control method for controlling the same.

Description of the Related Art

Many consumer video cameras perform a development process on raw data obtained by performing analog-to-digital (A/D) conversion on output data from an image sensor, then perform lossy compression or lossless compression on the raw data, and record the processed data. On the other hand, some professional video cameras for capturing a motion picture record raw data as it is, or perform lossless compression on raw data and record the processed data. The reason why image data is recorded in the raw format is to specify various parameters in a development process, whereby it is possible to achieve the development of the image data as intended by a user and also edit the image data on a frame-by-frame basis. In a case where image data is recorded in the raw format, generally, development parameters including a lens parameter are simultaneously recorded as additional information of the image data so that the development parameters can be used in the development of the image data.

With the resolution of an image sensor enhanced, the number of pixels, i.e., the amount of data, per frame of raw image data increases exponentially. For example, the publication of Japanese Patent Application Laid-Open. No. 2007-166551 discusses the process of reducing the size of a raw image to the degree desired by a user and recording the raw image.

Further, for example, the publication of Japanese Patent Application Laid-Open. No. 2010-016648 discusses an imaging apparatus for, each time the stop value of an imaging lens system and the pupil positions change, recording lens information including the stop value and the pupil positions in a moving image file.

The processing of image signals having large-capacity data for 4K or ultra-high-definition television requires a large-scale circuit and increases power consumption. This may lead to a rise in the temperature of the main body of an imaging apparatus. In response, it is possible to employ the configuration in which the imaging apparatus is physically separated into an imaging unit and a recording unit, and these units are connected by a cable. However, in a case where a moving image is recorded in the raw format, image correction data of each frame is required for a development process. Thus, the imaging unit needs to transmit raw image data and image correction data for the development process to the recording unit.

For example, in the configuration in which raw image data output from an imaging unit is input to and recorded in a recording unit or an external recording device using a one-way communication interface such as serial digital interface (SDI), a method for notifying the imaging unit that the recording is started in the recording unit is not prepared. To perform a development process on the raw image data, image correction data for the development process is required. Examples of the required image correction data include data attributable to an image sensor, such as data for correcting the level of a pixel in an effective area using the level of an optical black area (hereinafter, an "OB area") and correction address data for a defective pixel. Examples of the required image correction data also include data attributable to a lens, such as marginal illumination fall-off correction data for correcting marginal illumination fall-off due to the lens position, and chromatic aberration correction data for correcting chromatic aberration caused by the lens position. In the case of the data attributable to the image sensor, the higher resolution the image sensor has, the vaster the amount of data is. The correction data using the OB area changes according to the number of vertical lines and the number of horizontal lines. Further, the higher the resolution, the larger the number of defective pixels. Thus, the amount of address data also increases exponentially. Further, in a case where gains are switched in such a manner that the level of the OB area changes, it is necessary to provide correction data for each gain. The correction data attributable to the lens also differs for each lens position. Thus, the amount of data increases as the lens position is subdivided into many positions. In the current situation, the amount of data for correcting the level of a pixel in an effective area using the level of an OB area is 1 megabyte or more, and the amount of correction address data for a defective pixel is several hundreds of kilobytes. There is a possibility that each of the amounts of data balloons to several times as much, depending on the specifications of the image sensor. Further, the amount of marginal illumination fall-off correction data and the amount of chromatic aberration correction data are several tens of kilobytes per lens, which is relatively small. If, however, the lens position is subdivided, these amounts of data increase to several hundreds of kilobytes. In the configuration in which the imaging unit cannot know that the recording is started in the recording unit, the imaging unit needs to continuously output image correction data. However, this increases the amount of the image correction data itself and shortens the time in which the recording unit can record. For example, in a case where the above data is added to each frame, about 2 megabytes of correction data is required per frame. If the frame rate is 60p, the amount of data per minute is 7200 megabytes, which is a vast amount. Further, the imaging unit also requires a large processing load for outputting image correction data for each frame.

It also possible to provide a control apparatus for controlling the imaging unit and the recording unit to operate cooperatively. In such a case, however, the configuration including the imaging unit, the recording unit, and the control apparatus is dedicated for exclusive use, which is inflexible.

SUMMARY

The present disclosure is directed to an imaging system, an imaging apparatus, and a control method for controlling the same that are capable of, the configuration in which an imaging unit and a recording unit are separated from each other, reducing the amount of image correction data and reducing the processing load of the imaging unit.

According to an aspect of the present disclosure, an imaging system includes an imaging apparatus including an imaging unit configured to capture an object, and an output unit configured to output image data obtained by the imaging unit and image correction data to be used to correct the image data to outside the imaging apparatus intermittently in cycles of two or more frames, and an external recording device including an operation unit configured to input a recording start instruction, a recording unit configured to record in a recording medium the image data and the image correction data output from the imaging apparatus, and a recording control unit configured to, after the recording start instruction is input, control the recording unit to start recording in the recording medium the image correction data output from the imaging apparatus.

Further features of the present disclosure will become apparent from the following description of exemplary embodiments with reference to the attached drawings.

BRIEF DESCRIPTION OF THE DRAWINGS

FIGS. 2A and 2B are flowcharts illustrating processing procedures of a camera and an external recording device according to one or more aspects of the present disclosure.

DESCRIPTION OF THE EMBODIMENTS

With reference to the drawings, exemplary embodiments according to one or more aspects of the present disclosure wild be described in detail below.

Figure 1:
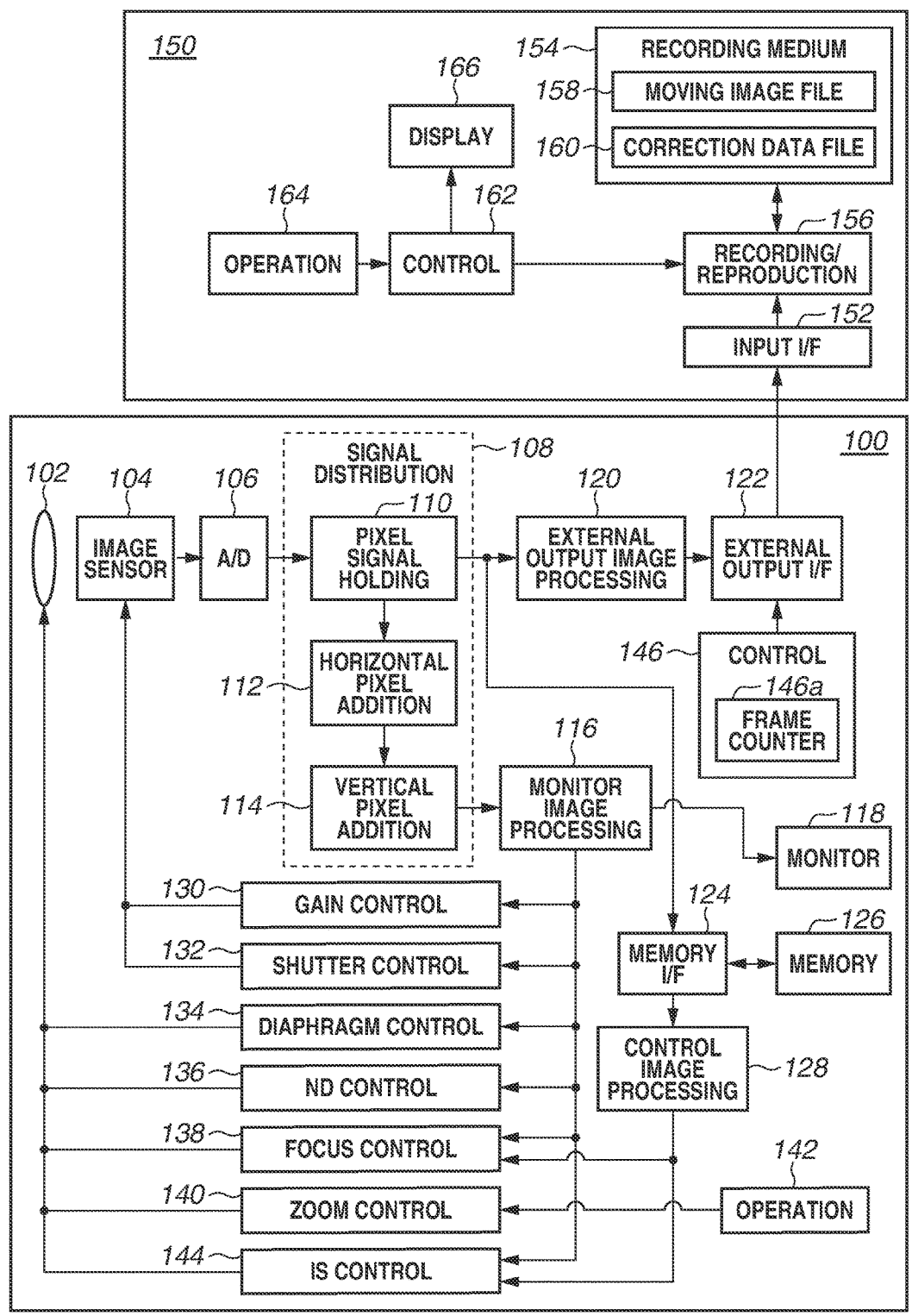
FIG. 1 is a block diagram illustrating a general configuration according to one or more aspects of the present disclosure.

A first exemplary embodiment is described below. FIG. 1 illustrates a block diagram of the general configuration of an example of an imaging system according to the present, disclosure. In the present exemplary embodiment, a digital video camera 100, which is an example of an imaging apparatus, and an external recording device 150, which records image data and image correction data output from the camera 100, are included. A data output terminal of the digital video camera 100 connects to an input terminal of the external recording device 150 via serial digital interface (SDI) such as 3G-SDI.

An imaging lens system 102 of the digital video camera 100 includes a diaphragm, a neutral density (ND) filter, a focus lens, a zoom lens, and a shift lens and makes an optical image from an object incident on an image sensor 104. The image sensor 104 converts the optical image from the imaging lens system 102 into an analog image signal and outputs the analog image signal to an analog-to-digital (A/D) converter 106. The A/D converter 106 converts the image signal from the image sensor 104 into a digital signal and supplies the digital image signal to a signal distributor 108. The digital image signal output from the A/D converter 106 is image data in the raw format, i.e., raw image data.

The signal distributor 108 includes a pixel signal holding unit 110, which stores raw image data for several pixels, a horizontal pixel addition unit 112, and a vertical pixel addition unit 114. The horizontal pixel addition unit 112 adds pixel signals for four pixels in the horizontal direction to a pixel signal temporarily held in the pixel signal holding unit 110 and outputs the addition result as a pixel signal for a single pixel. The vertical pixel addition unit 114 adds pixel signals for four pixels in the vertical direction to image data thinned out to a quarter in the horizontal direction and output from the horizontal pixel addition unit 112 and outputs the addition result as a pixel signal for a single pixel. Consequently, image data thinned out to a quarter in the horizontal direction by the horizontal pixel addition unit 112 and thinned out to a quarter in the vertical direction by the vertical pixel addition unit 114 is generated for a viewfinder. The signal distributor 108 outputs, to a monitor image processing unit 116, raw image data thinned out in the horizontal and vertical directions from the vertical pixel addition unit 114. The signal distributor 108 outputs raw image data for all pixels buffered by the pixel signal holding unit 110 to an external output image processing unit 120 and a memory interface (I/F) 124.

The monitor image processing unit 116 corrects the difference in level, caused by the image sensor 104, of the raw image data from the signal distributor 108. For example, the monitor image processing unit 116 corrects the level of a pixel in an effective area using data of an optical black (OB) area and corrects a defective pixel using surrounding pixels. Further, the monitor image processing unit 116 performs a marginal illumination fall-off correction process, a color correction process, a contour enhancement process, a noise removal process, a gamma process, a debayer process, and a compression process on the raw image data. The monitor image processing unit 116 supplies the image data subjected to these processes to a monitor 118. The monitor 118 displays an image represented by the image data from the monitor image processing unit 116. A user views the image displayed on the monitor 118 and confirms the angle of view of the image.

The external output image processing unit 120 corrects the difference in level, caused by the image sensor 104, of the raw image data from the signal distributor 108. For example, the external output image processing unit 120 corrects the level of a pixel ill an effective area using data of an OB area and corrects a defective pixel using surrounding pixels. Further, the external output image processing unit 120 performs a marginal illumination fall-off correction process, a color correction process, a contour enhancement process, a noise removal process, a gamma process, a debayer process, and a compression process on the raw image data. The external output image processing unit 120 outputs the processed raw image data to an external output I/F 122.

A memory I/F 124 writes to a memory 126 the raw image data for all the pixels output from the signal distributor 108, reads the raw image data stored in the memory 126, and supplies the raw image data to a control image processing unit 128. The memory 126 can store raw image data for all pixels of several frames. The control image processing unit 128 performs image processing necessary for focus control and image stabilizer (IS) control on the raw image data from the memory I/F 124 and generates control data for the focus control and control data for the IS control. The control image processing unit 128 supplies the generated control data to a focus control unit 138 and an IS control unit 144.

A gain control unit 130 references a result (or an intermediate result) of the processing performed by the monitor image processing unit 116, calculates the luminance level of image data, and controls the internal gain of the image sensor 104 according to the calculated luminance level. Further, a shutter control unit 132 also references a result (or an intermediate result) of the processing performed by the monitor image processing unit 116 and calculates the luminance level of image data. The shutter control unit 132 controls the shutter speed (the exposure time) of the image sensor 104 according to the calculated luminance level. A diaphragm control unit 134 references a result (or an intermediate result) of the processing performed by the monitor image processing unit 116, calculates the luminance level of image data, and controls the diaphragm of the imaging lens system 102 according to the calculated luminance level. An ND control unit 136 references a result (or an intermediate result) of the processing performed by the monitor image processing unit 116, calculates the luminance level of image data, and controls the amount of attenuation of the ND filter of the imaging lens system 102 according to the calculated luminance level.

In a case where the luminance levels based on which the gain, the shutter speed, the stop value, and the amount of attenuation of the ND filter are controlled can be the same, the monitor image processing unit 116 may collectively calculate the luminance levels.

The focus control unit 138 references a result (or an intermediate result) of the processing performed by the monitor image processing unit 116 and a control signal from (or a result of the processing performed by) the control image processing unit 128 and calculates the degree of focus or the in-focus position of the imaging lens system 102. Based on the calculation results, the focus control unit 138 controls the focus lens of the imaging lens system 102 to be at the in-focus position. A zoom control unit 140 controls the zoom lens of the imaging lens system 102 according to focal length information input from an operation unit 142.

The IS control unit 144 references a result (or an intermediate result) of the processing performed by the monitor image processing unit 116 and a control signal from (or a result of the processing performed by) the control image processing unit 128 and calculates the motion vector of the object. Then, the IS control unit 144 controls the shift lens of the imaging lens system 102 according to the calculated motion vector.

A control unit 146 is an imaging control unit for controlling the imaging operation of the camera 100 and the operation of outputting image data and image correction data to outside the camera 100. The control unit 146 includes a frame counter 146*a*, which counts frames to identify which frame raw image data output from the external output I/F 122 belongs to. The control unit 146 references the count value of the frame counter 146*a* and supplies image correction data for use in the process of developing raw image data to the external output. I/F 122 in a predetermined frame cycle. The image correction data includes one or more of pieces of data regarding, for example, the correction of a defective pixel, the correction of marginal illumination fall-off, the correction of chromatic aberration, and noise removal and clamp processes using an OF area. The external output I/F 122 continuously outputs to the external recording device 150 the raw image data from the external output image processing unit 120 while outputting the image correction data to the external recording device 150 such that the image correction data interrupts the raw image data at predetermined timing.

The external recording device 150 includes an input I/F 152, which loads data continuously output from the external output I/F 122 of the camera 100, and a recording/reproduction unit 156, which records and reproduces the loaded data in a recording medium 154. Although the details will be described below, the recording/reproduction unit 156 stores the raw image data from the camera 100 in a moving image file 158 in the recording medium 154 and stores the image correction data from the camera 100 in a correction data file 160 in the recording medium 154. A control unit 162 is a recording control unit for controlling the external recording device 150. Particularly, according to the input of the image correction data from the camera 100, the control unit 162 controls the operation of recording in the recording medium 154 by the recording/reproduction unit 156. The user can input various instructions to the control unit 162 using an operation unit 164. The control unit 162 displays an operation state and a warning on a display unit 166.

FIGS. 2A and 2B are flowcharts illustrating processing procedures of the camera 100 and the external recording device 150. FIG. 2A illustrates the processing procedure of the camera 100. FIG. 2B illustrates the processing procedure of the external recording device 150. The control unit 146 of the camera 100 achieves the processing procedure illustrated in FIG. 2A. The control unit 162 of the external recording device 150 achieves a part of the processing procedure illustrated in FIG. 2B.

With reference to FIG. 2A, the operation of the camera 100 is described. In step S201, the control unit 146 references the count value of the frame counter 146*a* and determines whether the frame number of image data currently output from the external output I/F 122 is a multiple of N cycles. N is an integer equal to or greater than 2.

If it is determined that the count value of the frame counter 146*a* is a multiple of N cycles (YES in step S201), then in step S202, the control unit 146 causes the external output I/F 122 to output both raw image data and image correction data. If the count value of the frame counter 146*a* is not a multiple of N given cycles (NO in step S201), then in step S203, the control unit 146 causes the external output I/F 122 to output only the raw image data. That is, the control unit 146 controls the external output I/F 122 to output the image correction data to outside the camera 100 in two or more frame cycles.

After the process of step S202 or S203 is finished, the control unit 146 performs the process of step S201 in the next frame.

With reference to FIG. 2B, the operation of the external recording device 150 is described. In step S211, the user turns on the external recording device 150 using a power switch of the operation unit 164. In step S212, the user connects the external recording device 150 to the camera 100.

In step S213, the control unit 162 waits for the establishment of a connection with the camera 100. For example, if raw image data is successfully received from the camera 100, the control unit 162 can determine that a connection with the camera 100 is established.

In step S214, the control unit 162 determines whether image correction data received. If image correction data is not received (NO in step S214), then in step S215, the control unit 162 prohibits the recording/reproduction unit 156 from recording in the recording medium 154. Then, in step S216, the control unit 162 determines whether a recording start instruction is given by the user using the operation unit 164. If a recording start instruction is given using the operation unit 164 (YES in step S216), then in step S217, the control unit 162 displays on the display unit 166 a warning that recording is prohibited. Then, the control unit 162 executes the processes of step S214 and thereafter. If a recording start instruction is not given (NO in step S216), the control unit 162 executes the processes of step S214 and thereafter.

If it is determined in step S214 that image correction data is received (YES in step S214), then in step S218, the control unit 162 determines whether the received image correction data is image correction data for which a file has not yet been generated. If the received image correction data is image correction data for which a file has not yet been generated (YES in step S218), then in step S219, the control unit 162 controls the recording/reproduction unit 156 to generate in the recording medium 154 a correction data file 160 in which the image correction data is to be stored. In step S220, the control unit 162 permits the recording/reproduction unit 156 to record in the recording medium 154. According to this recording permission, the recording/reproduction unit 156 writes the raw image data from the camera 100 in a moving image file 158 and writes the image correction data from the camera 100 in the correction data file 160.

If a correction data file 160 in which the received image correction data is to be stored is present in the recording medium 154 in step S218 (NO in step S218), the control unit 162 permits the recording/reproduction unit 156 to record in the recording medium 154. At this time, the recording/reproduction unit 156 writes the image correction data from the camera 100 the existing correction data file 160 in the recording medium 154.

Figure 3:
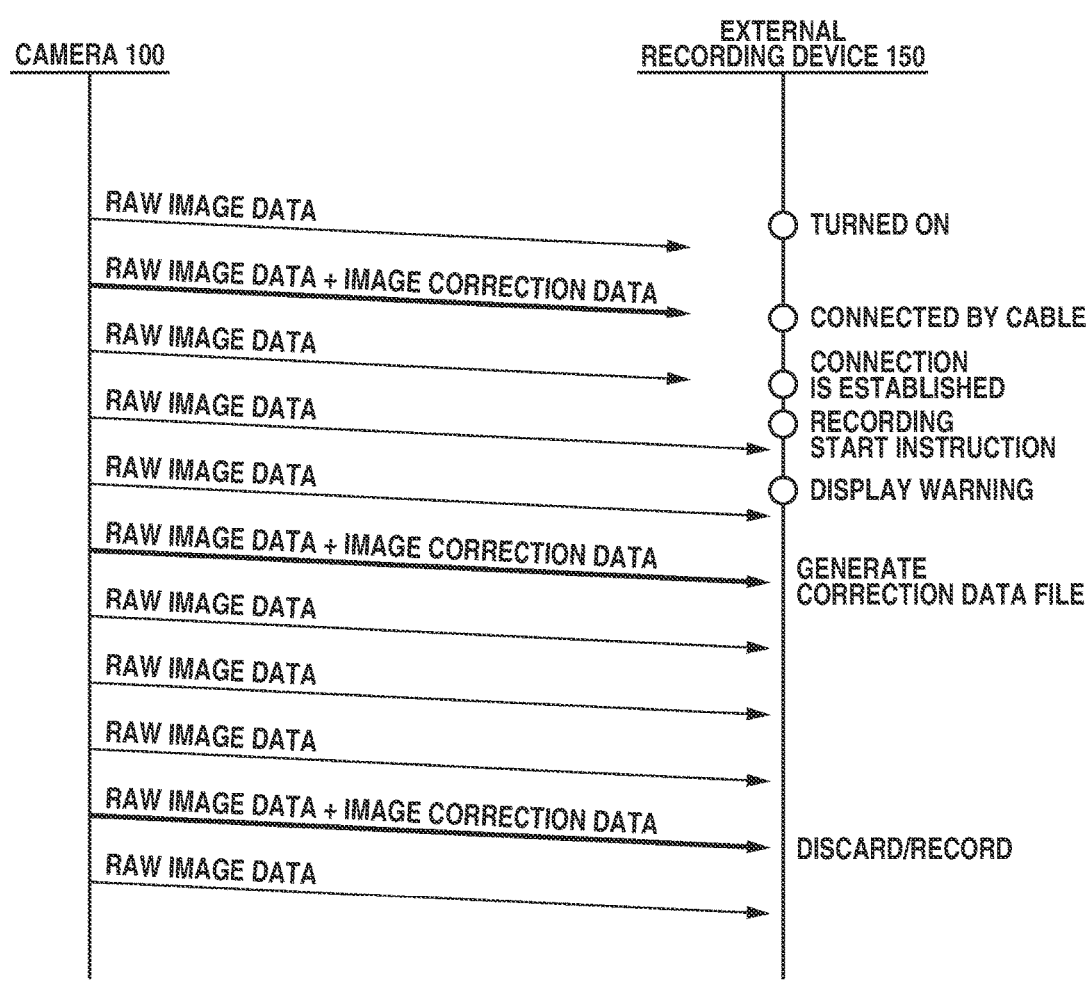
FIG. 3 is a sequence diagram of image data and image correction data corresponding to FIGS. 2A and 2B.

FIG. 3 illustrates a sequence diagram of the camera 100 and the external recording device corresponding to the processing procedures illustrated in FIGS. 2A and 2B. As illustrated in FIG. 3, the camera 100 outputs raw image data in a frame cycle while also outputting image correction data every predetermined frame cycles (N frame cycles in the example illustrated FIG. 2A). At this time, since the amount of data of the aperture value and the lens positions is small, data of the aperture value and the lens positions is transmitted for each frame by superimposing the data on an image signal in a conventional manner.

After a connection with the camera 100 is established, the external recording device 150 can receive the raw image data and the image correction data output from the camera 100. If the user gives a recording start instruction before the external recording device 150 receives the image correction data, the external recording device 150 displays on the display unit 166 a warning that a correction data file has not yet been generated. According to the reception of the image correction data after a recording start instruction is given, the external recording device 150 generates a correction data file and records the image correction data in the generated correction data file. The external recording device 150 does not record the image correction data received thereafter and discards the received image correction data. The case where the external recording device 150 discards the received image correction data is a case where the content of the image correction data does not change. The external recording device 150 continuously records a data value that changes while an image is captured, such as data for correcting the level of a pixel in an effective area using the level of an OB area. Correction address data for a defective pixel does not change while an image is captured. Thus, the external recording device 150 discards the correction address data. If marginal illumination fall-off correction data and chromatic aberration correction data for all the lens positions have already been received, the external recording device 150 may continuously record only the stop value and the lens positions.

The image correction data is transmitted from the camera 100 to the external recording device 150 intermittently in cycles of two or more frames, whereby it is possible to reduce the processing load of the camera 100 for outputting image correction data and also reduce the amount of image correction data to be transmitted.

In the above exemplary embodiment, a recording operation is prohibited until the external recording device 150 receives image correction data. Alternatively, recording may be permitted while a warning is displayed in response to a recording start instruction.

Further, in the present exemplary embodiment, the description has been given on the assumption that all image correction data is transmitted in a single frame. However, there is also a possibility that the data size of the image correction data exceeds a data size that can be transmitted in a single frame. Further, there is also a possibility that the processing load of the imaging apparatus may reach an unacceptable level. The configuration may be such that in these cases, the image correction data is divided into arbitrary sizes, and the divided pieces of image correction data are transmitted separately in a plurality of frames. Further, the configuration may be such that as the processing of the imaging apparatus side, correction data specialized in a lens, such as marginal illumination fall-off correction data, is not transmitted while a lens is being replaced or when a lens has not yet been attached. Consequently, it is possible to temporarily reduce the size of image correction data and reduce the processing load.

Figure 4:
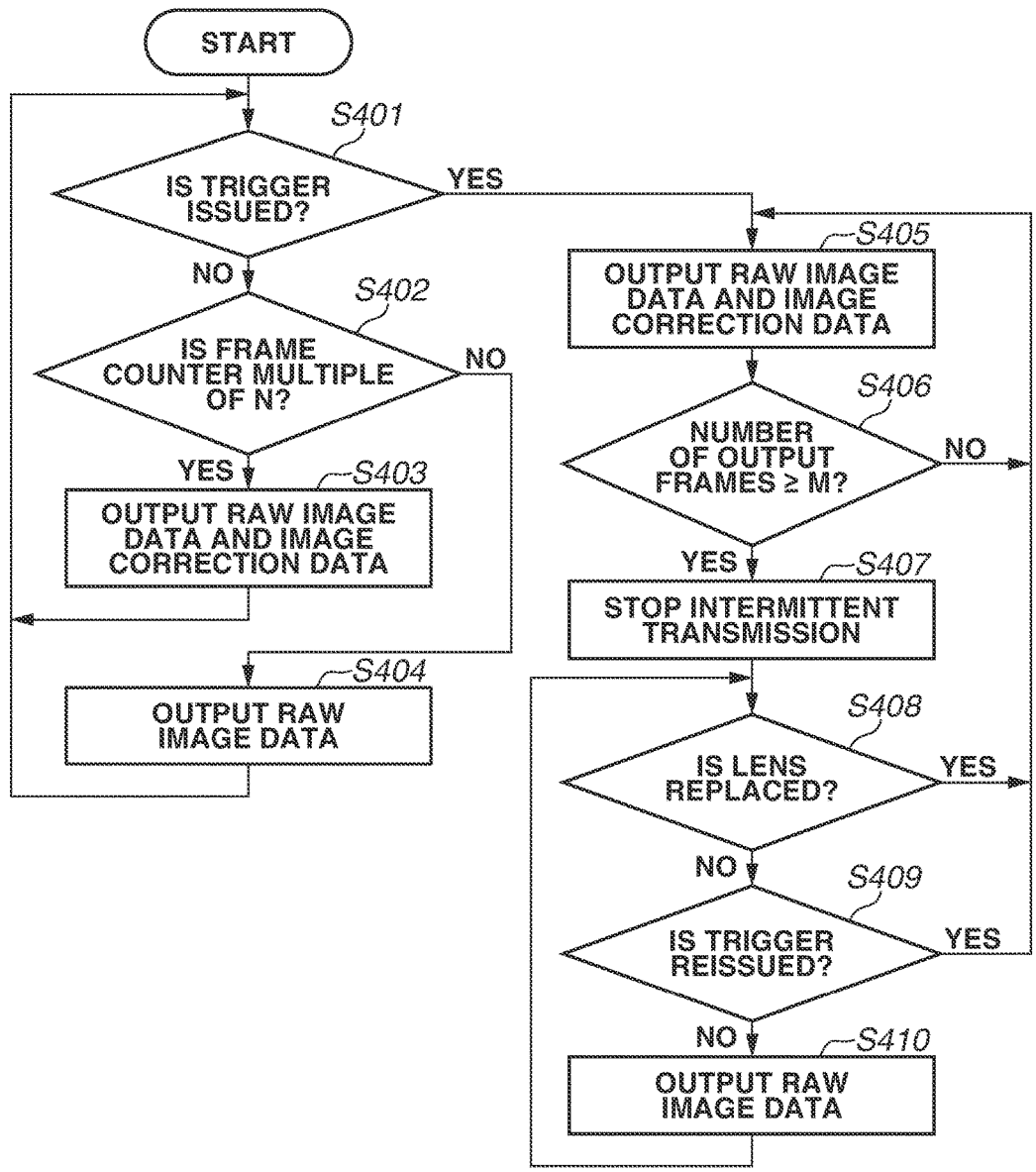
FIG. 4 is a flowchart illustrating a processing procedure of a camera according to one or more aspects of the present disclosure.

A second exemplary embodiment is describe below. A description is given of a varied operation of the camera 100 in a case where the camera 100 can detect a connection with the external recording device 150. FIG. 4 illustrates a flowchart of the varied operation. For example, there is a case where a switch for detecting a connection with a cable is provided in an existing cable connection terminal. The control unit 146 uses a connection detection output from such a switch as a trigger in step S401 and executes the processing of steps S405 to S410. In a case where the user can notify the control unit 146 of a connection with the external recording device 150 using an operation unit (not illustrated) of the camera 100, this notification may be used as a trigger in step S401. After the external recording device 150 is connected to the camera 100, then according to an instruction given by the user to output image correction data, the control unit 146 may forcibly output image correction data to the external recording device 150. In this case, the instruction given by the user to output image correction data can be considered as a trigger in step S401.

A processing procedure illustrated in FIG. 4 is described. In step S401, the control unit 146 determines whether a trigger as described above indicating the establishment of a connection with the external recording device 150 is issued. If a trigger indicating the establishment of a connection with the external recording device 150 is not issued (NO in step S401), then in steps S402 to S404, the control unit 146 outputs image correction data every N predetermined frame cycles by a procedure similar to that described in steps S201 to S203. That is, in step S402, the control unit 146 references the count value of the frame counter 146a and determines whether the frame number image data currently output from the external output I/F 122 is a multiple of N given cycles. N is an integer equal to or greater than 2. If the count value of the frame counter 146a is a multiple of N given cycles (YES in step S402), then in step S403, the control unit 146 causes the external output I/F 122 to output both raw image data and image correction data. If the count value of the frame counter 146a is not a multiple of N given cycles (NO in step S402), then in step S404, the control unit 146 causes the external output I/F 122 to output only the raw image data. After the process of step S403 or S404 is finished, the processing returns to step S401. In step S401, the control unit 146 determines whether a trigger is issued.

If it determined in step S401 that a trigger indicating the establishment of a connection with the external recording device 150 is issued (YES in step S401), then in step S405, the control unit 146 causes the external output I/F 122 to output both raw image data and image correction data. In step S406, the control unit 146 determines whether the number of frames in which the image correction data is output is equal to or greater than an arbitrary number of times M. The control unit 146 repeats the process of step S405 until the number of frames in which the image correction data is output is equal to or greater than the number of times M in step S406.

If the number of frames in which the image correction data is output is equal to or greater than the number of times M in step S406 (YES in step S406), then in step S407, the control unit 146 stops controlling the intermittent transmission of the image correction data executed in N frame cycles. In step S408, the control unit 146 determines whether a lens replaced. If it is determined in step S408 that a lens is replaced (YES in step S408), the control unit 146 clears a counter, held in the control unit 146, of the number of frames in which the image correction data is output. Then, the processing returns to step S405. If it is determined in step S408 that a lens is not replaced (NO in step S408), then in step S409, the control unit 146 determines whether a trigger indicating the establishment of a connection with the external recording device 150 is reissued. If it is determined in step S409 that a trigger indicating the establishment of a connection with the external recording device 150 is reissued (YES in step S409), the control unit 146 clears the counter, held in the control unit 146, of the number of frames in which the image correction data is output. Then, the processing returns to step S405. If it is determined in step S409 that a trigger indicating the establishment of a connection with the external recording device 150 is not reissued (NO in step S409), then step S410, the control unit 146 causes the external output I/F 122 to output only the raw image data and executes the process of step S408 in the next frame.

The operation of the external recording device 150 corresponding to the processing illustrated in FIG. 4 is similar to the operation described with reference to FIG. 2 and therefore is not described here.

Figure 5:
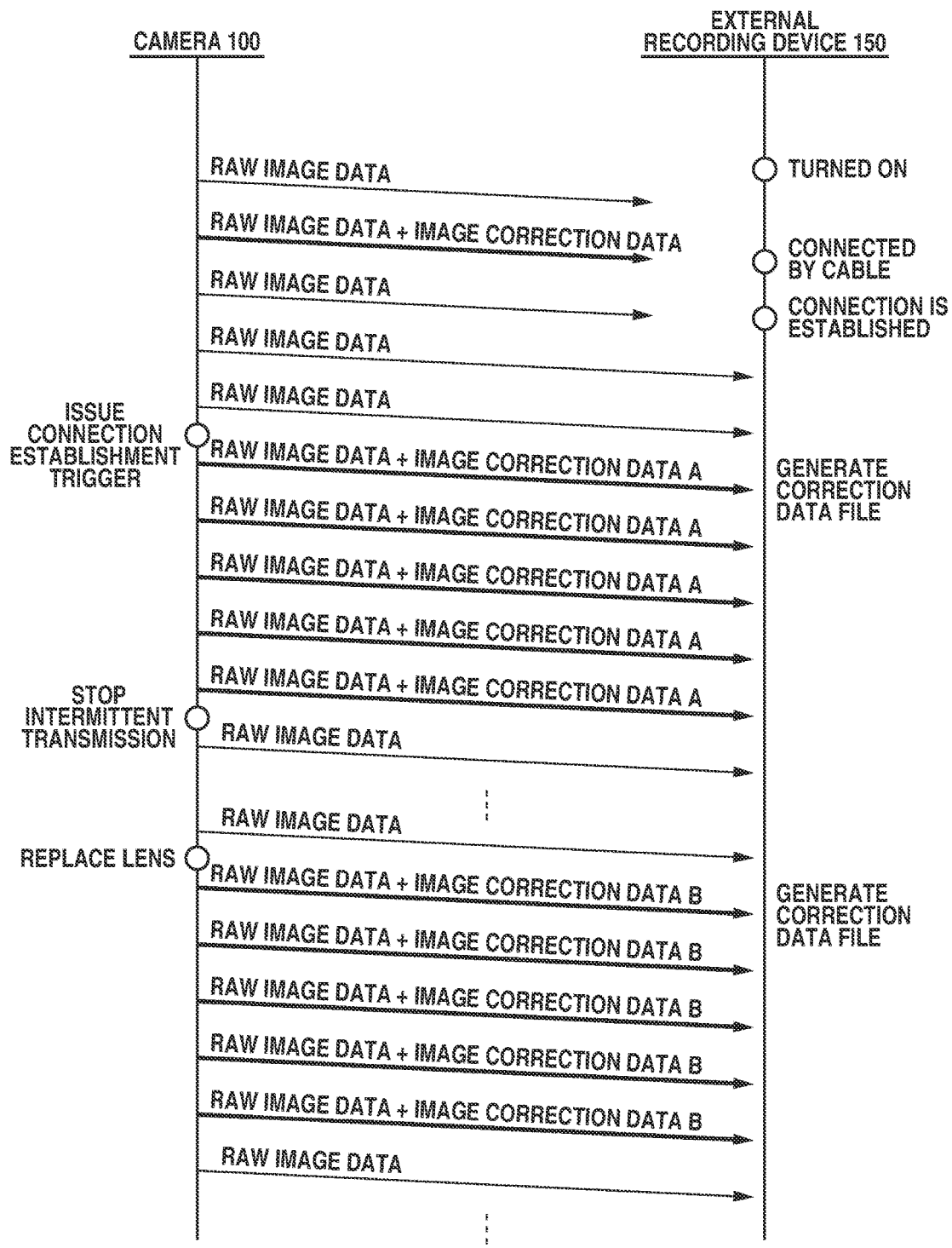
FIG. 5 is a sequence diagram of image data and image correction data corresponding to FIG. 4.

FIG. 5 illustrates a sequence diagram of the camera 100 and the external recording device corresponding to the processing procedure illustrated in FIG. 4. Also in the second exemplary embodiment, the camera 100 outputs raw image data in a frame cycle while also outputting image correction data every N frame cycles as illustrated in FIG. 5. It is assumed that in this state, a trigger indicating the establishment of a connection with the external recording device 150 is issued by a connection detection output from a switch or a predetermined user operation. Further, it is also assumed that similarly to the first exemplary embodiment described with reference to FIG. 3, data of the stop value and the lens positions is transmitted every frame by superimposing the data on an image signal in a conventional manner.

If detecting a trigger indicating the establishment of a connection with the external recording device 150, the control unit 146 of the camera 100 causes the external output I/F 122 to output both the raw image data and the image correction data for a certain period. This is a process for enabling the external recording device 150 to certainly load the image correction data. If the output for the certain period is finished, the control unit 146 stops controlling the intermittent transmission of the image correction data and transitions to the transmission of only the raw image data.

A trigger indicating the establishment of a connection with the external recording device 150 is reissued by lens replacement or a user operation. According to this trigger, the control unit 146 causes the external output I/F 122 to output both the raw image data and the image correction data for the certain period again and then transitions to the transmission of only the raw image data.

The external recording device 150 operates as follows. After the external recording device 150 is turned on, the external recording device 150 connects to the camera 100 via 3G-SDI. At this timing, the camera 100 is caused by, for example, a user operation to issue a trigger indicating the establishment of a connection with the external recording device 150. Consequently, image correction data is supplied from the camera 100 to the external recording device 150 for the certain period. Then, immediately after preparation for loading is completed, the external recording device 150 loads the image correction data and stores the image correction data in a correction data file.

From this point forward, according to the reissuance of a trigger indicating the establishment of a connection with the external recording device 150 by lens replacement or a user operation, the camera 100 outputs the image correction data for the certain period as described above. In response to this, if a correction data file has not yet been generated, the external recording device 150 newly generates a correction data file and records the image correction data in the generated correction data file. If a correction data file has already been generated, the external recording device 150 discards the image correction data from the camera 100. The case where the external recording device 150 discards the received image correction data is a case where the content of the image correction data does not change. The external recording device 150 continuously records a data value that changes while an image is captured, such as data for correcting the level of a pixel in an effective area using the level of an OB area. Correction address data for a defective pixel does not change while an image is captured. Thus, the external recording device 150 discards the correction address data. If marginal illumination fall-off correction data and chromatic aberration correction data for all the lens positions have already been received, the external recording device 150 may continuously record only the aperture value and the lens positions.

The image correction data is transmitted from the camera 100 to the external recording device 150 intermittently in cycles of two or more frames, whereby it is possible to reduce the processing load of the camera 100 for outputting image correction data and also reduce the amount of image correction data to be transmitted.

According to a predetermined trigger, image correction data is output from the camera 100 for a certain period in each frame, whereby the external recording device 150 can load the image correction data and record the image correction data in the recording medium 154 early. After the lapse of the certain period, the camera 100 transitions to the mode of intermittently outputting the image correction data. Thus, it is possible to reduce the processing load of the camera 100 for outputting image correction data and also reduce the amount of image correction data to be transmitted.

Also in the second exemplary embodiment, a recording operation is prohibited until the external recording device 150 receives image correction data. Alternatively, recording may be permitted while a warning is displayed in response to a recording start instruction.

Also in the second exemplary embodiment, the description has been given on the assumption that all image correction data is transmitted in a single frame. Alternatively, the configuration may be such that depending on the data size of the image correction data, the image correction data is divided into arbitrary sizes, and the divided pieces of image correction data are transmitted separately in a plurality of frames. Further, it is also effective to employ the configuration in which as the processing of the imaging apparatus side, correction data specialized in a lens, such as marginal illumination fall-off correction data, is not transmitted or a label is not added to metadata while a lens is being replaced or when a lens has not yet been attached.

In the second exemplary embodiment, the description has been given on the assumption that all image correction data is transmitted in a single frame. Alternatively, the configuration may be such that depending on the data size of the image correction data, the image correction data is divided into arbitrary sizes, and the divided pieces of image correction data are transmitted separately in a plurality of frames. Further, it is also effective to employ the configuration in which as the processing of the camera 100, correction data specialized in lens, such as marginal illumination fall-off correction data, is not transmitted or a label is not added to metadata while a lens is being replaced or when a lens has not yet been attached.

In the above description, by a manual operation using a menu or a dedicated button, the camera 100 is notified of the establishment of a connection with the external recording device 150. As a varied configuration, the external recording device 150 may notify the camera 100 of the establishment of a connection, using a communication method such as wireless communication separately from a communication method for an image signal.

A third exemplary embodiment is described below. In the third exemplary embodiment, a description is given of the configuration in which the camera 100 and the external recording device 150 are connected via a communication medium enabling two-way communication. In the third exemplary embodiment, the camera 100 and the external recording device 150 can know the operation states of each other. Thus, it is possible to achieve appropriate transmission of image correction data from the camera 100 to the external recording device 150. As a result of this, it is possible to reduce the processing load of the camera 100 for outputting image correction data and also reduce the amount of image correction data to be transmitted.

Figure 6:
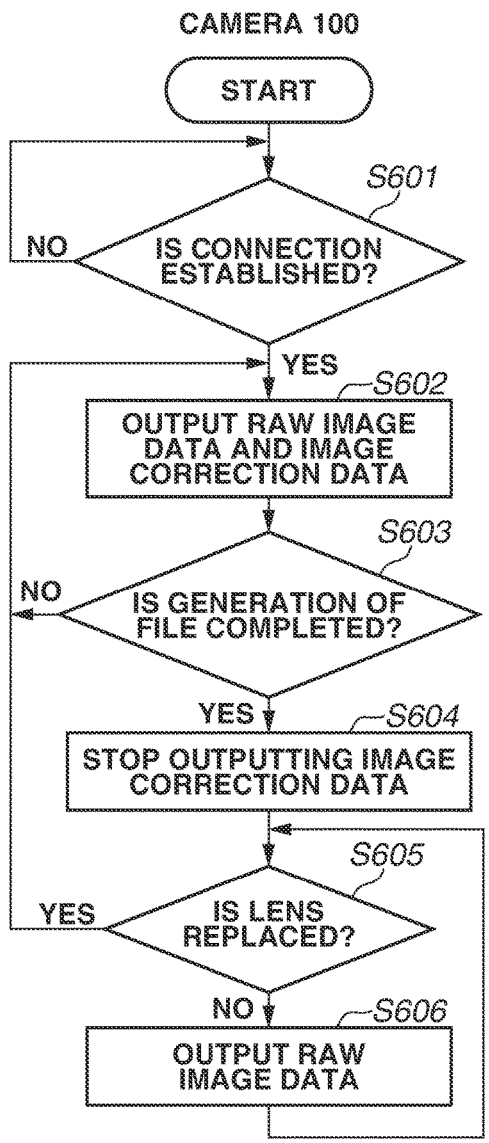
FIGS. 6A and 6B are flowcharts illustrating processing procedures of a camera and an external recording device according to one or more aspects of the present disclosure.

FIGS. 6A and 6B illustrate flowcharts of processing procedures of the camera 100 and the external recording device 150 according to the third exemplary embodiment. FIG. 6A illustrates the processing procedure of the camera 100. FIG. 6B illustrates the processing procedure of the external recording device 150. The control unit 146 of the camera 100 achieves the processing procedure illustrated in FIG. 6A. The control unit 162 of the external recording device 150 achieves a part of the processing procedure illustrated in FIG. 6B.

With reference to FIG. 6A, the operation of the camera 100 according to the third exemplary embodiment is described. In step S601, the control unit 146 waits for the establishment of a connection with the external recording device 150. At this time, for example, if a connection with the camera 100 is established, the external recording device 150 notifies the camera 100 that a connection is established.

If confirming the establishment of a connection with the external recording device 150 in step S601 (YES in step S601), then in step S602, the control unit 146 causes the external output I/F 122 to output both raw image data and image correction data. In step S603, the control unit 146 determines whether a notification that the generation of a file is completed is received from the external recording device 150. If a notification that the generation of a file is completed is not received from the external recording device 150 in step S603 (NO in step S603), then in step S602, the control unit 146 causes the external output I/F 122 to output both the raw image data and the image correction data in the next frame.

If a notification that the generation of a file is completed is received from the external recording device 150 in step S603 (YES in step S603), then in step S604, the control unit 146 stops the transmission of the image correction data to the external recording device 150. In step S605, the control unit 146 determines whether a lens is replaced. If it is determined in step S605 that a lens is replaced (YES in step S605), the processing returns to step S602. If, on the other hand, it is determined in step S605 that a lens is not replaced (NO in step S605), then in step S606, the control unit 146 causes the external output I/F 122 to output only the raw image data and executes the process of step S605 in the next frame.

With reference to FIG. 6B, the operation of the external recording device 150 according to the third exemplary embodiment is described. In step S611, the control unit 162 determines whether a connection with the camera 100 is established. The control unit 162 repeats the process of step S611 until a connection with the camera 100 is established in step S611.

If it is determined in step S611 that a connection with the camera 100 is established (YES in step S611), then in step S612, the control unit 162 notifies the camera 100 that a connection is established. In step S613, the control unit 162 determines whether image correction data is received from the camera 100. If it is determined in step S613 that image correction data is not received (NO in step S613), the control unit 162 executes the process of step S612 again. If it is determined in step S613 that image correction data is received (YES in step S613), the processing proceeds to step S614.

If it is determined in step S613 that image correction data is received (YES in step S613), then in step S614, the control unit 162 determines whether the received image correction data is image correction data for which a file has not yet been generated. If the received image correction data is image correction data for which a file has not yet been generated in step S614 (YES in step S614), the processing proceeds to step S615. In step S615, the control unit 162 controls the recording/reproduction unit 156 to generate in the recording medium 154 a correction data file 160 in which the image correction data is to be stored step S616, the control unit 162 notifies the camera 100 that the generation of a correction data file is completed.

If the received image correction data is image correction data for which a file has already been generated in step S614 (NO in step S614), the control unit 162 does not newly generate a file, and the processing proceeds to step S616. In step S616, the control unit 162 notifies the camera 100 that the generation of a correction data file is completed. Then, the processing returns to step S612.

The external recording device 150 repeats the processes of steps S612 and S613 until another piece of image correction data is transmitted from the camera 100 by lens replacement or the like.

Figure 7:
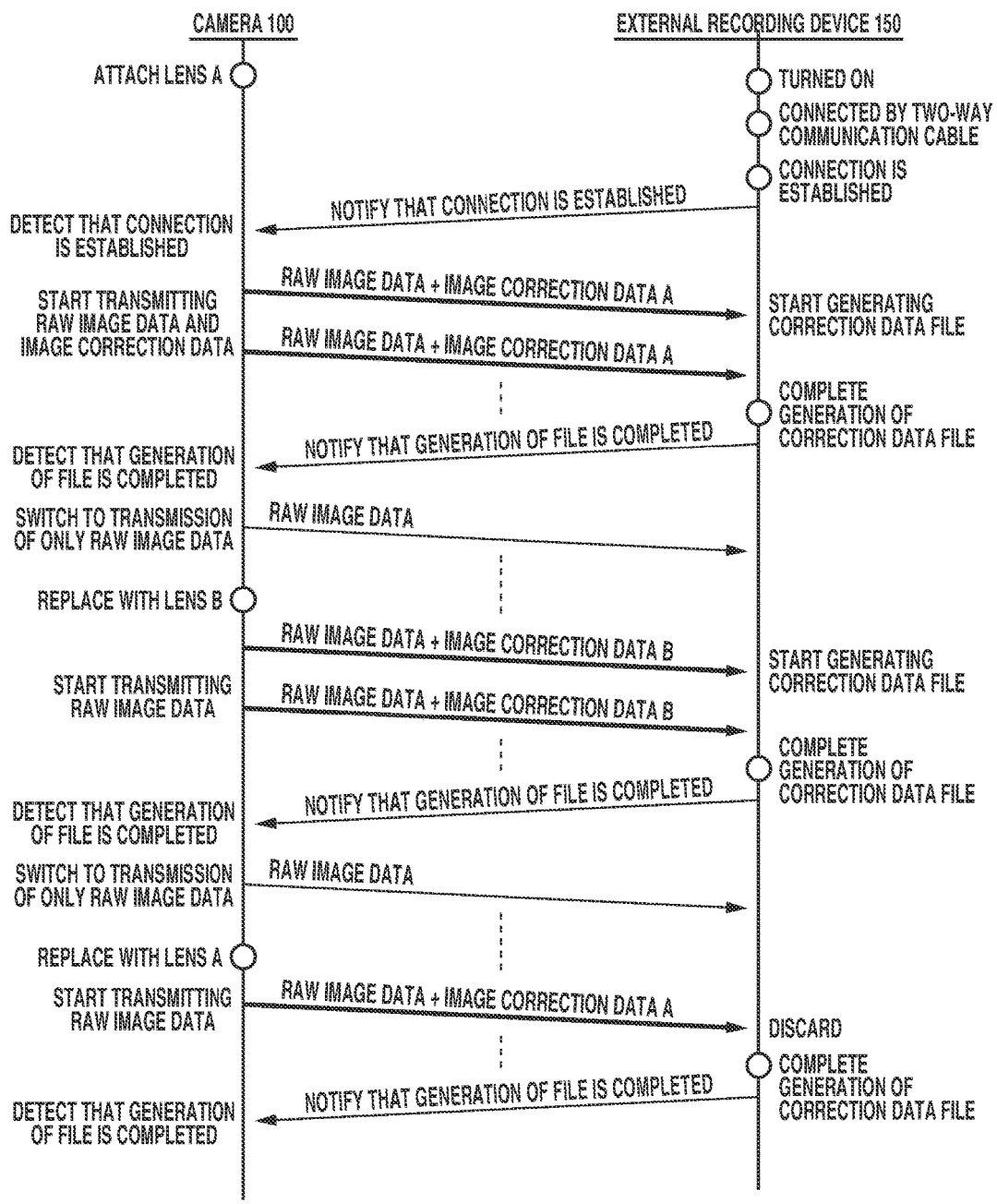
FIG. 7 is a sequence diagram of image data and image correction data corresponding to FIGS. 6A and 6B.

FIG. 7 illustrates a sequence diagram of the camera 100 and the external recording device 150 corresponding to the processing procedures illustrated in FIGS. 6A and 6B. At this time, it is assumed that a lens A is attached to the camera 100.

If receiving from the external recording device 150 a notification that a connection is completed, the camera 100 starts outputting both raw image data and image correction data. Then, if receiving from the external recording device 150 a notification that the generation of a correction data file completed, the camera 100 transitions to the state or the mode of outputting only the raw image data without outputting the image correction data.

If the lens A is replaced with a lens B in the camera 100, the camera 100 starts outputting image correction data including data regarding the lens B. If receiving from the external recording device 150 a notification that the generation of a correction data file is completed, the camera 100 transitions to the state or the mode of outputting only the raw image data without outputting the image correction data.

If the lens B is replaced with the lens A again in the camera 100, the camera 100 starts outputting image correction data including data regarding the lens A. If receiving from the external recording device 150 a notification that the generation of a correction data file is completed, the camera 100 transitions to the state or the mode of outputting only the raw image data without outputting the image correction data.

The user connects the external recording device 150 and the camera 100 using a cable enabling two-way communication and turns on the external recording device 150. The external recording device 150 notifies the camera 100 that a connection with the camera 100 is established. Immediately after preparation is completed, the external recording device 150 generates a correction data file and transitions to the state where the external recording device 150 can record image correction data. At the timing when the generation of the correction data file is completed, the external recording device 150 notifies the camera 100 that the generation of a correction data file is completed.

If the lens A is replaced with the lens B in the camera 100, the camera 100 supplies image correction data including data regarding the lens B to the external recording device 150. This image correction data is new image correction data for the external recording device 150. Thus, the external recording device 150 needs to generate a new correction data file. In response, the external recording device 150 generates a correction data file, and if the generation of this correction data file is completed, the external recording device 150 notifies the camera 100 that the generation of a correction data file is completed.

If the lens B is replaced with the lens A in the camera 100, the camera 100 supplies image correction data including data regarding the lens A to the external recording device 150. In the external recording device 150, the correction data file for which this image correction data is to be stored has already been generated. In response, the external recording device 150 immediately notifies the camera 100 that the generation of a correction data file is completed. Then, the external recording device 150 discards the received image correction data (the image correction data including the data regarding the lens A).

In the third exemplary embodiment, image correction data is transmitted when a connection is established. Alternatively, the image correction data may not be transmitted when a connection is established, and the image correction data may be transmitted when recording is started or ended for the first time after the connection is established. Consequently, in a case where the external recording device 150 is merely connected to the camera 100 and does not actually record, it is possible to prevent the external recording device 150 from generating an unnecessary correction data file.

In the present exemplary embodiment, the camera 100 outputs image correction data to the external recording device 150 at appropriate timing. Thus, it is possible to reduce the processing load of the camera 100 for outputting image correction data and also reduce the amount of image correction data to be transmitted. Also the configuration in which minimum necessary communication is executed between the camera 100 and the external recording device 150 according to the states of the camera 100 and the external recording device 150 leads to a reduction in the processing load for outputting image correction data and a reduction in the amount of image correction data to be transmitted.

In the present exemplary embodiment, the description has been given on the assumption that all image correction data is transmitted in a single frame. Alternatively, the configuration may be such that depending on the data size of the image correction data, the image correction data is divided into arbitrary sizes, and the divided pieces of image correction data are transmitted separately in a plurality of frames. Further, it is also effective to employ the configuration in which as the processing of the imaging apparatus side, correction data specialized in a lens, such as marginal illumination fall-off correction data, is not transmitted or a label is not added to metadata while a lens is being replaced or when a lens has not yet been attached.

While the present disclosure has been described in detail based on exemplary embodiments, the present disclosure is not limited to these specific exemplary embodiments. The present disclosure also includes various forms without departing from the spirit and scope of the disclosure. Parts of the above exemplary embodiments may be appropriately combined together. Particularly, a moving image is taken as an example in the present exemplary embodiments. However, it goes without saying that a similar effect can be obtained also by applying the present disclosure to a still image.

Further, the present disclosure also includes the case of supplying, directly from a recording medium or using wired or wireless communication, a program of software for achieving the functions of the above exemplary embodiments to system or an apparatus including a computer capable of executing a program, thereby executing the supplied program.

According to the present disclosure, image correction data is intermittently output from an imaging apparatus to outside the imaging apparatus, and therefore, it is possible to reduce the processing load of the imaging apparatus. Further, the intermittent output also enables an external recording device to record the image correction data even with some delay.

Other Embodiments

Embodiments of the present disclosure can also be realized by a computer of a system or apparatus that reads out and executes computer executable instructions recorded on a storage medium (e.g., non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2016-045144, filed Mar. 9, 2016, which is hereby incorporated by reference herein in its entirety.

What is claimed is:

1. An imaging system comprising:
an imaging apparatus including:
an imaging unit configured to capture an object, and
an output unit configured to output image data obtained by the imaging unit and image correction data used to correct the image data to outside the imaging apparatus intermittently in cycles of two or more frames; and
an external recording device including:
an operation unit configured to input a recording start instruction,
a recording unit configured to record in a recording medium the image data and the image correction data output from the imaging apparatus, and
a recording control unit configured to, after the recording start instruction is input, control the recording unit to start recording in the recording medium the image correction data output from the imaging apparatus,
wherein the imaging apparatus controls the output unit to output the image correction data together with the image data for a predetermined period in each frame of the image data according to trigger indicating establishment of a connection with the external recording device, and not to output the image correction data until a next trigger indicating establishment of a connection with the external recording device and replacement of a lens are detected after a lapse of the predetermined period.

2. The imaging system according to claim 1, wherein the trigger is generated by a user operation.

3. The imaging system according to claim 1, wherein the trigger is a signal which the external recording device notifies the imaging apparatus of.

4. The imaging system according to claim 1, wherein the recording unit records the image correction data in a correction data file in the recording medium.

5. The imaging system according to claim 4, wherein the recording unit records, in different correction data files in the recording medium, pieces of image correction data including pieces of data of lenses different in the image correction data.

6. The imaging system according to claim 1, wherein the image data is raw image data.

7. The imaging system according to claim 1, wherein the image correction data includes any one of pieces of data regarding correction of a defective pixel, correction of marginal illumination fall-off, correction of chromatic aberration, and noise removal and clamp processes using an optical black (OB) area.

8. The imaging system according to claim 1, wherein the output unit uses a one-way communication interface.

9. An imaging apparatus comprising:
an imaging unit configured to capture an object;
an output unit configured to output image data obtained by the imaging unit and image correction data used to correct the image data to outside the imaging apparatus; and
a control unit configured to control the output unit to output the image correction data to outside the imaging apparatus intermittently in cycles of two or more frames of the image data
wherein the control unit controls the output unit to output the image correction data together with the image data for a predetermined period in each frame of the image data according to a trigger indicating establishment of a connection with an external recording device connected to the output unit, and not to output the image correction data until a next trigger indicating establishment of a connection with the external recording device and replacement of a lens are detected after a lapse of the predetermined period, the control unit controls the output unit.

10. The imaging apparatus according to claim 9, wherein the image data is raw image data.

11. The imaging apparatus according to claim 9, wherein the image correction data includes any one of pieces of data regarding correction of a defective pixel, correction of marginal illumination fall-off, correction of chromatic aberration, and noise removal and clamp processes using an optical black (OB) area.

12. The imaging apparatus according to claim 9, wherein the output unit uses a one-way communication interface.

13. A control method for controlling an imaging apparatus including an imaging unit configured to capture an object, and an output unit configured to output image data obtained by the imaging unit to outside the imaging apparatus, the control method comprising:
generating image correction data used to correct the image data; and
controlling the output unit to output the image correction data to outside the imaging apparatus intermittently in cycles of two or more frames of the image data
controlling the output unit to output the image correction data together with the image data for a predetermined period in each frame of the image data according to a trigger indicating establishment of a connection with an external recording device connected to the output unit, and
controlling the output unit not to output the image correction data until a next trigger indicating establishment of a connection with the external recording device and replacement of a lens are detected after a lapse of the predetermined period, the control unit controls the output unit.

* * * * *